Nov. 23, 1937.            C. H. HAVILL              2,099,808
                           AIRCRAFT
                       Filed Jan. 7, 1936
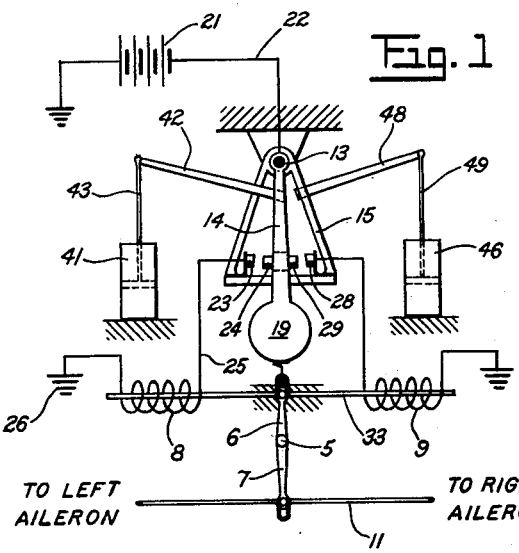
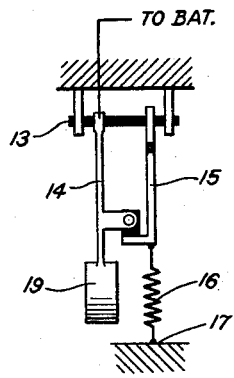
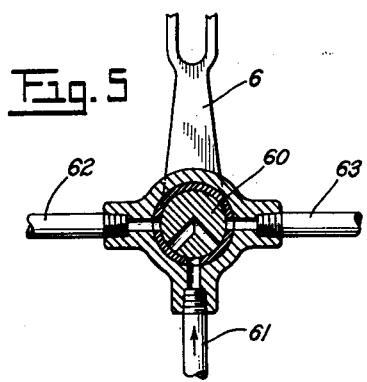
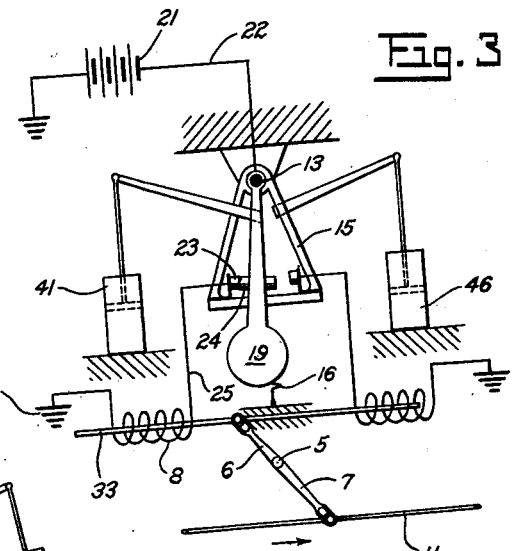
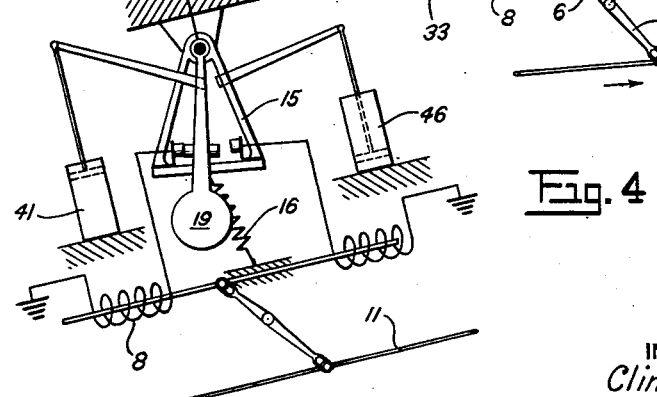
INVENTOR.
Clinton H. Havill
BY
ATTORNEY Patented Nov. 23, 1937

2,099,808

UNITED STATES PATENT OFFICE 2,099,808

AIRCRAFT

Clinton H. Havill, South Orange, N. J., assignor to Eclipse Aviation Corporation, East Orange, N. J., a corporation of New Jersey Application January 7, 1936, Serial No. 57,979

3 Claims. (Cl. 244—77)

This invention relates to aircraft, and particularly to the control of the craft's attitude during flight.

An object of the invention is to provide for the automatic return of the craft to a level position following an atmospherically induced departure from the normal attitude.

A further object is to utilize a plurality of successively acting pendulous bodies as the agency for actuation of the means for maintaining the craft's transverse or longitudinal axis (or both) in a horizontal plane.

In the embodiment illustrated in the accompanying drawing the pendulous body causes the energization of electromagnetic means operatively connected with the ailerons of the aerofoil surfaces; but it is to be understood that the drawing is merely illustrative, rather than definitive of the limits of the invention, the latter being pointed out in the appended claims.

In the drawing:—

Fig. 1 is a partly diagrammatic and partly mechanical view of the embodiment above referred to;

Fig. 2 is a view of certain of the elements shown in Fig. 1 but at right angles to the view of Fig. 1;

Fig. 3 is a view of the elements shown in Fig. 1 but with the pendulum in circuit closing position;

Fig. 4 shows the pendulum in a more extreme circuit closing position; and

Fig. 5 shows a modified form of aileron actuator.

Reference character 5 indicates a rockshaft on which is secured a pair of arms 6 and 7 constituting an oscillating lever one end of which is adapted to be reciprocated by electromagnetic devices 8 and 9 to transmit a corresponding reciprocal movement to a rod 11 connecting with the usual ailerons, not shown, located on the opposite wings of the aircraft whose equilibrium is to be controlled. Rod 11 may be the usual manually actuated aileron shifting rod, or it may be additional thereto. (Of course the manually actuated aileron shifting rod will be operable, when desired for turning or banking purposes, even though the present invention is superimposed thereon.)

Reference character 13 indicates a second shaft on which there is suspended a pendulum 14 and a cradle 15 each being free to swing, but the freedom of the cradle being somewhat less than that of the pendulum, due to the provision of the spring 16 anchored at point 17 and connected at its opposite end to the cradle, and therefore tending to hold the cradle in the central position indicated in Fig. 1, but nevertheless yieldable to permit movement of the cradle to the position shown in Figs. 3 and 4 when the rolling of the aircraft becomes sufficiently pronounced.

It will be understood that the shaft 13 is rigidly mounted on the aeroplane, preferably in the fuselage, and therefore undergoes a shift in position about its own axis in response to any shift in the angular position of the fuselage about the longitudinal axis, and the cradle 15 will also partake of this angular shift (to the extent indicated in Figs. 3 and 4) while the pendulum will remain in a true vertical position due to its pendulous character, which is accentuated by the weighted construction indicated at 19. Therefore, rolling of the ship will bring the parts into the relative positions indicated in Fig. 3 and thereafter into the relative position indicated in Fig. 4, if the shift becomes sufficiently pronounced. In both these latter positions the cradle is restrained by the pendulum from further angular shift; but the shaft 13 may continue to shift angularly with the continued shifting of the fuselage. In both positions, Fig. 3 and Fig. 4, a circuit is closed to the solenoid 8, the current passing from the source 21 by way of conductor 22 connecting with the metallic pendulum 14 which is insulated from the shaft 13 so as to prevent a grounding of the current. From the pendulum 14 the current passes by way of contacts 23 and 24 to the conductor 25 and thence through the winding of the solenoid to ground 26. The contact 23 is preferably mounted on the cradle and insulated therefrom, as is also the contact 28, which is adapted to be engaged by the second pendulum mounted contact 29 in the event of a shift of the plane in the opposite angular direction, which shift would cause energization of the solenoid 9 rather than the solenoid 8. In either event the energization of one of the solenoids causes a movement of the magnetizable plunger 33, and by virtue of the lever connection 6, 7 there is a corresponding shift of the aileron actuating rod 11 which is so connected to the ailerons as to vary the wind pressure upon the aerofoil surfaces of the plane in a direction to compensate for the atmospheric disturbances which produce the rolling movement of the plane. This offsetting action of the ailerons will continue until the plane has again assumed an even keel, and if for any reason either the initial or the return swing of the cradle is sufficiently severe it will cause a closing of a circuit to the opposite solenoid and a resulting reverse movement of the ailerons even before the completion of the full return swing, such action continuing until the true horizontal condition has been definitely attained.

Reference character 41 indicates a dashpot effective to damp the vibrations of the pendulum 14 by reason of the connection to the said pendulum through the link 42 one end of which attaches to the pendulum and the other end to the plunger rod 43 of the dashpot, the amount of restriction whereof may be adjustable by any suitable means. A similar dashpot 46 for regulating the amount of damping effect upon the cradle 15 connects with said cradle through a link 48 attached to the plunger rod 49.

If it is desired to automatically control the position of the longitudinal axis of the plane, as well as, or in lieu of, the transverse axis, the invention may be applied to such purpose by mounting the shafts 5 and 13 or duplicates thereof, transversely of the fuselage and connecting the lever 6, 7 or duplicates thereof, to the ship's elevator and rudder actuating means.

Fig. 5 shows a rotary valve 60, shiftable by the solenoid actuated lever 6 to control connection of an oil or other fluid supply conduit 61 with either of two conduits 62, 63 leading to a fluid motor which may be substituted for the rod 11 as the aileron shifting means. Such fluid motor may be of any of the known types for obtaining a limited stroke or movement in either of two opposite directions. One such type of motor is illustrated in detail in my application No. 636,605, filed October 6, 1932, see particularly Figure 3 thereof, wherein an equivalent solenoid actuated valve is shown at 76, 77, and 78, the motor proper being shown at 52 and 53. Therefore claims to the specific structure of the motor, per se, or the valve, per se, are not made herein, but only to the combination with said valve and motor mechanism of the means disclosed herein for actuation thereof.

What I claim is:

1. In an aircraft of the type in which ailerons are employed as the means of controlling the position of the transverse axis of the craft, the combination with said ailerons of electromagnetic actuating means therefor, a switch controlling energization of said electromagnetic means, means including inter-engaging pendulous bodies for operating said switch in response to a departure of the craft from its normal flying attitude, and separately regulable dashpot means individual to each of said pendulous means to damp the movements thereof.

2. In an aircraft of the type in which airfoils are employed as the means of controlling the flying attitude of the craft, the combination with said airfoils of electromagnetic actuating means therefor, a switch controlling energization of said electromagnetic means, means including inter-engaging pendulous bodies for operating said switch in response to a departure of the craft from its normal flying attitude, and separately regulable means individual to each of said pendulous means to damp the movements thereof.

3. Means for maintaining an aircraft in level flight, comprising a restoring agency, a pair of pendulous bodies, inter-engageable to produce energization of said restoring agency, means responsive to deviation of the craft from a level attitude to cause inter-engagement of said bodies, means for de-energizing said restoring agency as soon as the level attitude is resumed, and means for damping the movements of said pendulous bodies during the entire restoring operation.

CLINTON H. HAVILL.